United States Patent [19]  [11] 4,179,146
Fischbach  [45] Dec. 18, 1979

[54] POT HANDLE
[75] Inventor: Wolfgang Fischbach, Daaden, Fed. Rep. of Germany
[73] Assignee: Heinrich Baumgarten, Eisen- und Blechenwaren Fabrik, Neunkirchen, Fed. Rep. of Germany
[21] Appl. No.: 919,457
[22] Filed: Jun. 27, 1978
[30] Foreign Application Priority Data
Jun. 29, 1977 [DE] Fed. Rep. of Germany ....... 2729269
[51] Int. Cl.$^2$ ............................................. A47J 45/06
[52] U.S. Cl. ............................... 294/27 H; 16/110 A; 16/114 A
[58] Field of Search .................. 294/27, 28, 29, 30, 294/31, 31.2, 32, 33, 34, 16; 16/114 A, 114 R, 110 A, 110 R; 220/94 R; D9/291; 224/45 A, 45 AA; 215/100 A

[56] References Cited
U.S. PATENT DOCUMENTS
4,083,081  4/1978  Witte ................................ 16/114 A
FOREIGN PATENT DOCUMENTS
2520025  11/1976  Fed. Rep. of Germany ........ 294/27 H Primary Examiner—James B. Marbert
Attorney, Agent, or Firm—Blanchard, Flynn, Thiel, Boutell & Tanis

[57] ABSTRACT

A pot handle construction having a support bar fixedly secured to a wall of the pot and a handle member having a recess therein which receives the support bar therein. The support bar has a hook thereon which is engaged with a shoulder member in the recess of the handle member. The support bar also has a pair of sloped surfaces which form an obtuse angle with respect to one another on a side of the support bar remote from the hook. A spring member is mounted in an undercut section in the walls of the recess on the handle member and initially engage one of the sloped surfaces forming the obtuse angle. The handle is pivoted about an axis formed between the hook and the shoulder member so that the spring is compressed by one of the sloped surfaces until the edge between the sloped surfaces is reached, thereafter the spring is permitted to expand while engaging the other sloped surface to draw the handle member onto the support member and snugly urge it against the wall of the pot.

5 Claims, 6 Drawing Figures

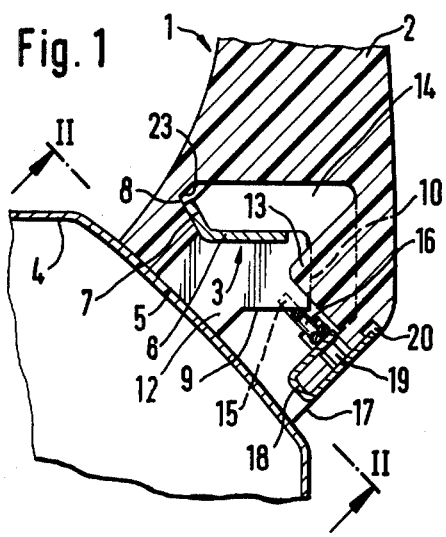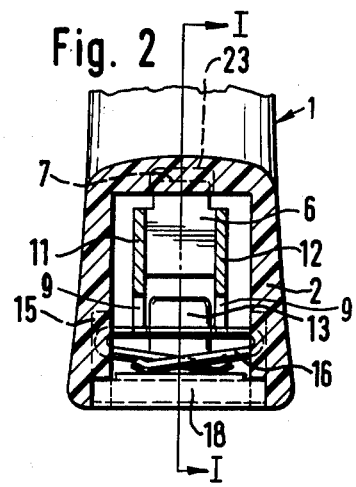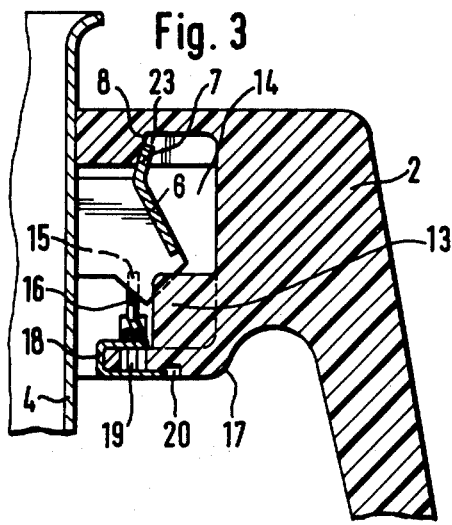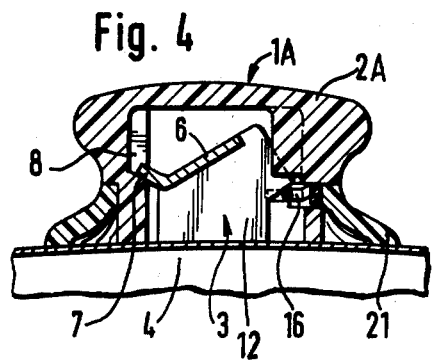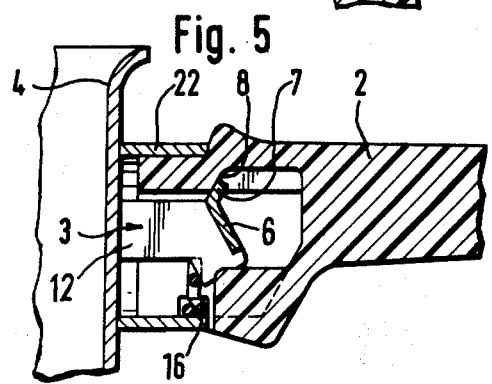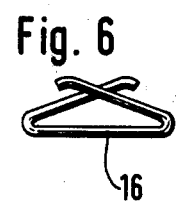

POT HANDLE

FIELD OF THE INVENTION

The invention relates to a pot handle, comprising a handle member and a support bar which can be permanently connected with the pot and which has at least one hook, the free end of which extends substantially parallel to the pot wall and cooperates with a suitably constructed shoulder of the handle member and of a spring to effect a holding of the handle member on the support bar.

BACKGROUND OF THE INVENTION

A pot handle which is described above, as it is known from German OS No. 1,934,241, shows the advantage that the weight of the pot is transmitted during its normal handling through the hook and the suitably constructed shoulder of the handle member onto the handle. The forces thus do not need to be transmitted during a normal stress, as this is the case with plugged in or clamped handles, through a spring which is interpositioned between support bar and handle member. The spring which in the known handle is combined additionally with the support bar is used to hold the handle on the pot when same is being emptied or stored. However, forces worth mentioning cannot be transmitted through this spring, so that also in the case of this handle there exists still the danger that during emptying of the content of the pot or during an unintended load oppositely directed to the normal direction of stress, the handle can come loose from the pot. Moreover, this known handle cannot be fixed on the pot without clearance with the shown spring arrangement, so that during handling there is an impression that the handle is loose or not correctly secured.

The basic purpose of the invention is to construct a pot handle of the above-mentioned type such that same can be secured to the pot without clearance and can also absorb forces, which act on the pot contrary to the common direction of stress.

This purpose is inventively attained by constructing two surfaces which form an obtuse angle with one another on the support bar on a side which is opposite the hook, which surfaces cooperate with a spring which is arranged in a recess in the handle member which starts out from the contact surface of the handle member on the pot, for receiving the support bar, which spring is guided in an undercut section of the handle member and is tensioned during movement of the handle onto the support bar with the aid of one of the two sloped surfaces, grips toward the end of the movement onto the support bar behind the other surface and urges the handle on the one hand against the pot and on the other hand against the support bar. According to the invention, a scissor-shaped spring, a spiral spring or a leaf spring having a very large spring deflection can be used, which is extremely advantageous in particular in view of the manufacturing tolerances and the tolerances occurring during enamelling. For securing the handle same is attached to the support bar in such a manner that the shoulder of the handle member grips behind the hook. The handle is thereafter rotated around the hook and the spring is tensioned through the first sloped surface and thereafter jumps or snaps behind the second sloped surface, which preferably is at an angle of approximately 45° with respect to the handle wall. The spring applies a force onto the handle, the component of which, which extends parallel to the pot wall and perpendicularly with respect to same, urges the handle on the one hand against the pot wall and prevents on the other hand that the handle can be released from the pot in a direction which is opposite to the usual direction of stress. The part of the spring which, after snapping over the edge between the sloped surfaces, is in contact with the sloped surface rests self-lockingly on same, so that the handle is practically form-lockingly secured on the support bar. A loosening of the handle without removal of the spring is not possible.

The spring is held in an undercut section in the recess in the handle which undercut section extends through to the outer side of the handle. A clip is moved over this undercut section, on which clip the spring is supported. If the handle is supposed to be removed, then the clip must be moved so far that the opening is freed or unblocked, after which the spring can be removed from the handle member. The handle can thus be removed easily at any time.

The clip is preferably constructed of a U shape and grips also over the outside of the handle member and thus forms a flame protection, which protects the handle from the effects of the heat.

As an additional lock against rotation, the handle has a nose, which grips between two legs on the support bar. Furthermore, the hook engages an undercut section of the handle member.

According to an advantageous embodiment of the invention, the free end of the hook is bent away from the pot wall at a flat or small acute angle. As a result, it is prevented that irregularities occurring during enamelling prevent movement of the handle member onto the hook.

BRIEF DESCRIPTION OF THE DRAWING

Several exemplary embodiments of the invention are described more in detail hereinafter with reference to the drawing, in which:

FIG. 1 is an inventive pot handle for a kettle;

FIG. 2 is a cross-sectional view taken along the line II—II of FIG. 1;

FIGS. 3 to 5 are three further exemplary embodiments according to the invention; and FIG. 6 illustrates the spring which is used to secure the handle to the kettle.

DETAILED DESCRIPTION

In FIG. 1 the pot handle which as a whole is identified with reference numeral 1, includes a handle member 2 secured to a support bar 3, which is welded to a wall 4 of a pot or kettle. The handle member 2 has a recess 14, into which engages the support bar 3.

The support bar 3 consists, as can be seen from FIGS. 1 and 2, of a substantially U-shaped bar having parallel legs 11, 12 and a middle bight portion 6. The legs 11, 12 are welded to the pot at their base 5. The middle bight portion 6 is bent outwardly from the wall 4 of the pot along a rear edge to form an outwardly pointing hook 7, behind which grips a shoulder 8 on the handle member 2. The shoulder 8 is defined by a recess or an undercut section 23 provided in the recess 14 in the handle member 2, so that the hook 7 is also held laterally, that is, is prevented from moving laterally within the undercut section 23.

The legs 11, 12 of the support bar 3 each have furthermore two sloped surfaces 9, 10 which form an obtuse angle with respect to one another, of which surfaces the surface 9 extends at approximately an angle of 45° with respect to the pot wall. A nose 13 extends into the recess 14 of the handle member 2 and projects and engages between the two legs 11, 12 of the support bar 3 and thus forms together with the hook 7 which engages the undercut section 23 a lock preventing rotation of the handle 1.

An undercut section 15 is provided in a pair of opposed walls of the recess 14 and each receives a spring 16 having a large spring deflection. The undercut section 15 extends along the walls of the recess 14 to the outer surface 17 of the handle member 2.

The spring 16 which is inserted into the undercut section 15 is held with the aid of a plate or clip 18, which covers or blocks the outwardly opening portion 19 of the undercut section 15. The clip 18 has a general U shape and can be moved in direction of the pot wall 4 to unblock the opening 19 so that the spring can be removed from the undercut section 15 for effecting a release of the handle and a removal of the handle member 2 from the pot. To make the movement of the clip 18 easier, a recess 20 is provided in the outer surface 17 of the handle member 2 adjacent the mouth of the recess 14. The recess 20 is used as an abutment for the clip 18 and is shaped so that, for example, a screwdriver can be inserted thereinto. The clip 18 which grips over the outer wall 17 of the handle serves at the same time as a shield against fire.

The mounting of a handle is accomplished as follows: First the spring 16 is inserted into the undercut section 15 of the handle member 2 and the locking clip 18 is moved to the blocking position relative to the opening 19, so that the spring can no longer fall out of the undercut section 15. The handle member 2 is thereafter moved so that the support bar 3 is received in the recess 14 in such a manner that the shoulder 8 grips behind the hook 7 of the support bar. Locking engagement of the handle 1 with the support bar 3 is done subsequently by a rotary movement of the handle about an axis extending parallel to a line perpendicular to the legs 11, 12. This axis is located between the hook 7 and the shoulder 8. The spring 15 is tensioned during a sliding along on the sloped surface 10 of the legs 11, 12 and after snapping over onto the surface 9 urges the handle 1 tightly and fixedly against the wall 4 of the pot. The slope of the surface 9 is arranged such that a reverse rotation of the handle is no longer possible.

The exemplary embodiment according to FIG. 3 differs from the one according to FIG. 1 only in that here the handle is secured to a vertical sidewall 4 of the pot. The wall 4 in FIG. 1 extends at an angle to the vertical, approximately 45°.

In the exemplary embodiment according to FIG. 4, a lid handle 1A is secured to a lid according to the same principle, as this is illustrated in FIGS. 1 to 3. The lid handle 1A consists of a handle member 2A and a solid flange member 21. The division of the handle member into two components is advantageous for manufacturing reasons. The lid handle is secured in the same manner as described earlier, however, the difference is that a detaching capability in the shown exemplary embodiment does not exist. The solid flange member 21 functions as the blocking member for the spring 16.

FIG. 5 shows the fastening of an elongate or stem handle on a pot. The support bar 3 and the pot handle are constructed in the same manner as described above in FIGS. 1 and 2. The blocking member for the spring 16 is a sleeve 22, which is urged against the pot wall 4 by the handle member 2. It is not shown how the handle 2 can be detached. Same could, however, be constructed similarly as this is shown in FIGS. 1 and 2.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a pot handle comprising a handle member having a recess therein and a support bar received in said recess and which is permanently connected to said pot and which has at least one hook, the free end of which extends substantially parallel to the pot wall and cooperates with a suitably constructed shoulder on said handle member and a spring to effect a holding of said handle member on said support bar, the improvement comprising wherein said support bar has two sloped surfaces which form an obtuse angle with one another on a side of the support bar which is opposite the hook, wherein a spring is arranged in said recess and cooperates with said sloped surfaces, said handle having an undercut section in said recess, said spring being guided in said undercut section which opens outwardly to facilitate an insertion of said spring into said undercut section, said spring being tensioned during movement of said handle onto said support bar with the aid of one of the two sloped surfaces, said spring gripping toward the end of the movement of said handle onto said support bar behind the other surface and urges said handle on the one hand against the pot and on the other hand against said support bar, said spring being supported on the one side thereof on the sloped surface and on the other side on a movable clip, which clip covers the outwardly opening part of the undercut section.

2. The improved pot handle according to claim 1, wherein the free end of said hook is bent away from the pot wall at an acute angle.

3. The improved pot handle according to claim 1, wherein said spring is constructed scissor-shaped, spiral-shaped or as a leaf spring.

4. The improved pot handle according to claim 1, wherein said clip is constructed U-shaped and grips over the outer surface of said handle member.

5. The improved pot handle according to claim 1, wherein said support bar is generally U-shaped having a pair of legs and a bight portion and wherein said handle member has a nose which is received between and engages the two legs of said support bar and wherein said hook engages into another undercut section on the handle member.

* * * * *